United States Patent
DiLorenzo

(10) Patent No.: US 6,438,450 B1
(45) Date of Patent: Aug. 20, 2002

(54) MULTI-ROOM ENTERTAINMENT SYSTEM WITH IN-ROOM MEDIA PLAYER

(76) Inventor: Mark DiLorenzo, P.O. Box 1658, Laguna Beach, CA (US) 92651

( * ) Notice: Subject to any disclaimer, the term of this patent is extended or adjusted under 35 U.S.C. 154(b) by 0 days.

(21) Appl. No.: 09/724,806

(22) Filed: Nov. 28, 2000

Related U.S. Application Data

(63) Continuation-in-part of application No. 09/292,839, filed on Apr. 14, 1999, now Pat. No. 6,256,554.

(51) Int. Cl.$^7$ ................................................. G06F 7/00
(52) U.S. Cl. .......................... 700/236; 700/231; 700/241
(58) Field of Search ................................ 700/231, 234, 700/236, 241; 348/1, 385, 387

(56) References Cited

U.S. PATENT DOCUMENTS

| | | |
|---|---|---|
| 4,414,467 A | 11/1983 | Gould et al. |
| 4,528,643 A | 7/1985 | Freeny, Jr. |
| 4,553,211 A | 11/1985 | Kawasaki et al. |
| 4,905,280 A | 2/1990 | Wiedemer |
| 5,150,817 A | 9/1992 | Livingston |
| 5,219,094 A | 6/1993 | Labriola |
| 5,339,250 A | 8/1994 | Durbin |
| 5,355,302 A * | 10/1994 | Martin et al. ............ 700/231 X |
| 5,415,319 A | 5/1995 | Risolia |
| 5,445,295 A | 8/1995 | Brown |
| 5,521,631 A * | 5/1996 | Budow et al. ............... 348/7 X |
| 5,633,839 A | 5/1997 | Alexander et al. |
| 5,647,505 A | 7/1997 | Scott |
| 5,734,719 A * | 3/1998 | Tsevdos et al. .............. 348/1 X |
| 5,748,485 A | 5/1998 | Christiansen et al. |
| 5,769,269 A | 6/1998 | Peters |
| 5,781,889 A | 7/1998 | Martin et al. |
| 5,794,217 A | 8/1998 | Allen |
| 5,798,785 A * | 8/1998 | Hendricks et al. .......... 348/1 X |
| 5,831,862 A | 11/1998 | Hetrick et al. |
| 5,848,398 A | 12/1998 | Martin et al. |
| 5,959,945 A * | 9/1999 | Kleiman .................. 700/241 X |
| 6,163,795 A * | 12/2000 | Kikinis ....................... 348/7 X |
| 6,232,539 B1 * | 5/2001 | Looney et al. ............ 84/609 X |
| 6,229,394 B1 * | 7/2001 | Kenner et al. .............. 709/217 |

* cited by examiner

Primary Examiner—Christopher P. Ellis
Assistant Examiner—Gene O. Crawford
(74) Attorney, Agent, or Firm—Fulwider Patton Lee & Utecht, LLP

(57) ABSTRACT

A plurality of media data, including audio data or audio/video data, are stored in a central database. A plurality of in-room, user interface systems access the media data through a central server. The central server presents to the in-room system a selection menu through which at least one of the media data may be selected. Upon selection of a media data by the user interface, the central server accesses the selected media data from the central database and transmits it to the in-room system. The media data may be transmitted by downloading the data to an intermediate system, playing the media data at the intermediate system and outputting the played media data to the in-room system through a communications line. The media data may also be transmitted by streaming the media data to the in-room system through a communications line. The central server may present to the in-room system any of a number of additional menus including a purchase menu through which the selected media data may be purchased, an activation menu through which communication between the in-room system and the central server may be established for a period of time, a radio menu through which any of a plurality of programmed media-data channels may be accessed and a mood menu through which the brightness of the image displayed on the in-room system video monitor may be affected.

23 Claims, 10 Drawing Sheets

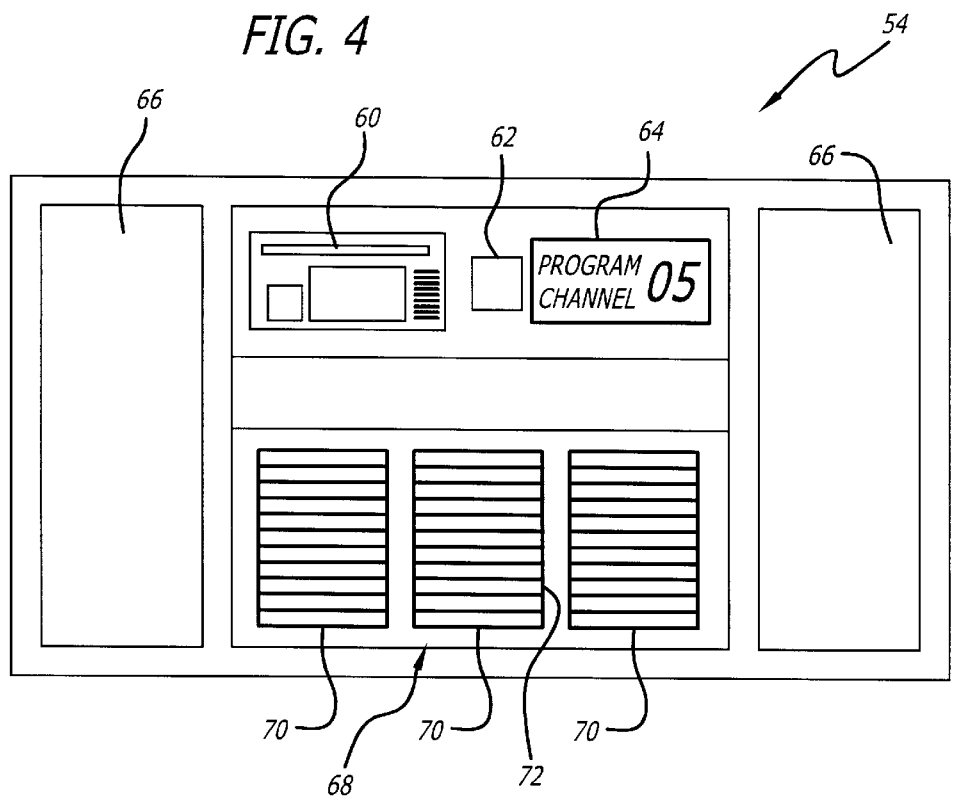
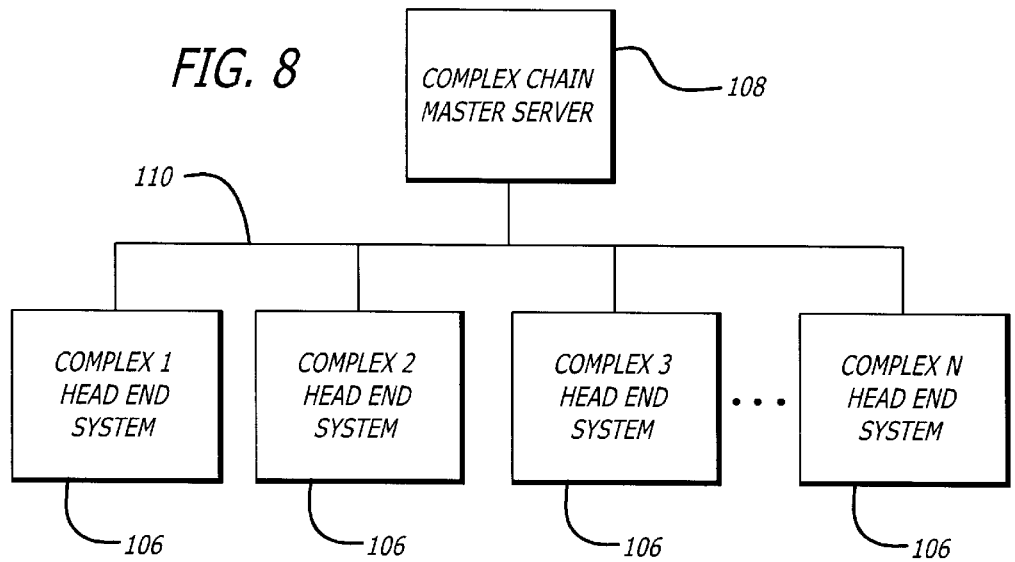

To Order CD's Call Toll Free (800) 555-1212

MULTI-ROOM ENTERTAINMENT SYSTEM WITH IN-ROOM MEDIA PLAYER

RELATED APPLICATIONS

This is a continuation-in-part of co-pending application Ser. No. 09/292,839 filed Apr. 14,1999, now U.S. Pat. No. 6,256,554.

BACKGROUND OF THE INVENTION

1. Field of the Invention

This invention relates generally to entertainment systems, and more particularly, to an entertainment system, including one or more media players/dispensers, for use in a multi-room complex such as a hotel. "Media" as used within the context of this disclosure includes audio and/or video data stored in the entertainment system that is accessible through the media player. This media is referred to as "access-only" media. As used within the context of this disclosure, "media" also includes tangible devices on which audio and/or video data is carried. For example, audio acquisition media may include compact discs (CDs), digital audio tape (DAT), mini discs, audio cassettes, while video acquisition media may include digital video discs (DVDs), video games and video cassettes. This type of media is referred to as "acquisition" media and is acquired through the media dispenser. Acquisition media further includes other forms of digital data such as computer software.

2. Description of Related Art

In-room hotel entertainment is typically limited to video entertainment such as cable TV, satellite TV and pay-per-view movies. For those desiring alternate forms of entertainment, such as music and talk radio, resort must be had to generally poor quality radios having poor quality radio reception and sound. In addition, should a guest desire to listen to a full-length recording by one or more artists they must travel not only with a collection of media, such as CDs, but also with a media player, such as a CD player. This is very inconvenient for the hotel guest.

While staying in a hotel, should a guest happen to hear a musical recording and decide to purchase a CD including the recording, he must locate a music store, often not an easy task for an out-of-town guest unfamiliar with the surroundings, and then travel to the music store. This too is inconvenient for the hotel guest.

Hence, there has been a long existing need in the art for a hotel entertainment system that provides hotel guests with quality audio entertainment, including a collection of selectable full-length recordings, which they may access within their rooms and be charged accordingly. There has also been a need for providing in-room acquisition of tangible media, such as CDs. The present invention fulfills all of these needs and others.

SUMMARY OF THE INVENTION

Briefly, and in general terms, the present invention is directed to an entertainment system, including one or more media players, for use in a multi-room complex such as a hotel.

In a first aspect, the invention relates to a method of providing selected media data to any one of a plurality of in-room systems, on-demand. The method comprises storing a plurality of media data in a central database and presenting to the in-room system a selection menu through which at least one of the media data may be selected. The method further includes accessing the selected media data from the central database and transmitting it to the in-room system. Also included in the method is presenting to the in-room system a purchase menu through which the selected media data may be purchased.

In detailed aspects of the method, the media data comprises audio data or audio/video data. In another detailed facet of the method, transmitting the media data to the in-room system comprises downloading the media data to an intermediate system, playing the media data at the intermediate system and outputting the played media data to the in-room system through a communications line. In yet another detailed facet, transmitting the media data to the in-room system comprises streaming the media data to the in-room system through a communications line.

In a second aspect, the invention relates to a method of providing selected media data to any one of a plurality of in-room systems for a predetermined time period. The method includes storing a plurality of media data in a central database. The method also includes presenting to the in-room system an activation menu by which communication between the central database and the in-room system is established for a period of time and presenting to the in-room system a selection menu through which at least one of the media data may be selected during the period of time. Further included in the method is accessing the selected media data from the central database and transmitting it to the in-room system.

In a detailed facet of the invention the method further includes storing data in the central database indicative of the number of times a media data is selected. In another aspect, the method further includes presenting to the in-room system a purchase menu through which the selected media data may be purchased. In a further detailed aspect, the method includes storing data in the central database indicative of the number of times a media data is purchased.

In a third aspect, the invention relates to a method of providing programmed channels of media data to one of a plurality of in-room systems. The method includes storing a plurality of media data in a central database. The method further includes programming a plurality of media-data channels. Each of the plurality of programmed media-data channels includes a select plurality of the media data. The method also includes transmitting each of the media-data channels over a different communications channel. Further included in the method is presenting to the in-room system a selection menu through which at least one of the media-data channels may be selected and upon selection of one of the media-data channels, connecting the in-room system with the communications channel associated with the selected media-data channel.

In a detailed aspect of the method, programming the plurality of media-data channels includes presenting to a plurality of in-room systems a selection menu through which at least one of the media data may be selected for playing; storing data in the central database indicative of the number of times a media data is selected and periodically updating each media-data channel play list to include that plurality of media data having a selection number meeting a specified criteria.

In a fourth aspect, the invention relates to a method of providing media data and monitor display control to any one of a plurality of in-room systems having a video monitor. The method includes storing a plurality of media data in a central database. The method also includes presenting through the video monitor a selection menu through which at least one of the media data may be selected and upon selection of one of the media data, accessing the selected media data from the central database and transmitting it to the in-room system. Also included in the method is presenting a mood menu comprising a brightness menu through which the brightness level of the video display may be selected. Upon the selection of a brightness level, the method further includes affecting the brightness of the image independent of any brightness control inherent in the video monitor.

These and other objects, aspects and advantages of the present invention will become apparent from the following more detailed description, when taken in conjunction with the accompanying drawings which illustrate, by way of example, the preferred embodiments of the invention.

BRIEF DESCRIPTION OF THE DRAWINGS

FIG. 4 depicts components of the media player/dispenser of FIG. 3 including a CD player, a CD dispenser, a pair of speakers and a display;

FIG. 8 is a block diagram depicting a complex chain master server interfacing with a plurality of complex head-end systems;

DETAILED DESCRIPTION OF THE PREFERRED EMBODIMENTS

Figure 1:
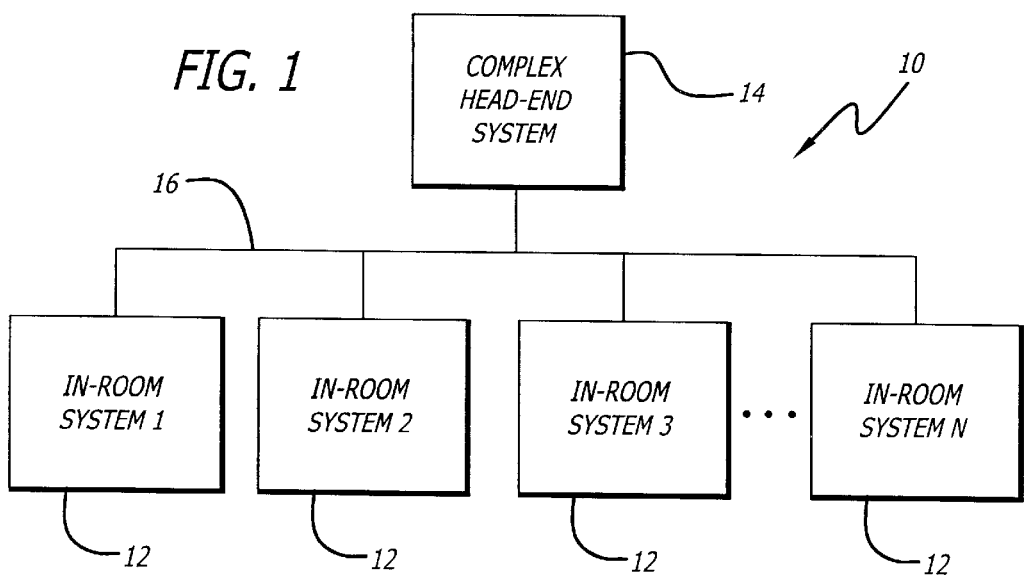
FIG. 1 is a block diagram of a multi-room entertainment system in accordance with the invention including a head-end system and a plurality of in-room systems interfaced through a communications line.

Referring now to the drawings, wherein like reference numerals among the several figures correspond to like elements, and more particularly to FIG. 1, the multi-room entertainment system 10 includes a plurality of in-room systems 12, located within several rooms of a given complex. For ease in describing the invention, the complex will be referred to as a hotel. The invention, however, is in no way limited to use in hotels. In FIG. 1, only four in-room systems 12 are shown. There may, however, be more or less in-room systems 12 depending on the particular requirements of a hotel. For example, some hotels may choose to place an in-room system 12 in every room while other hotels may select specific rooms for system installation.

Each in-room system 12 is linked to the head-end system 14. This link may occur through any given network line 16 depending on the infrastructure of the hotel. For example, typical hotels have an RF coaxial cable system already installed which provides signals from the hotel's master antenna television (MATV) system. The multi-room entertainment system 10 may take advantage of existing networks and connect the individual in-room systems 12 to the head-end system 14 through such networks. In tying the entertainment system into the MATV system, the present invention may supplement its media with additional media available over the MATV.

Figure 2:
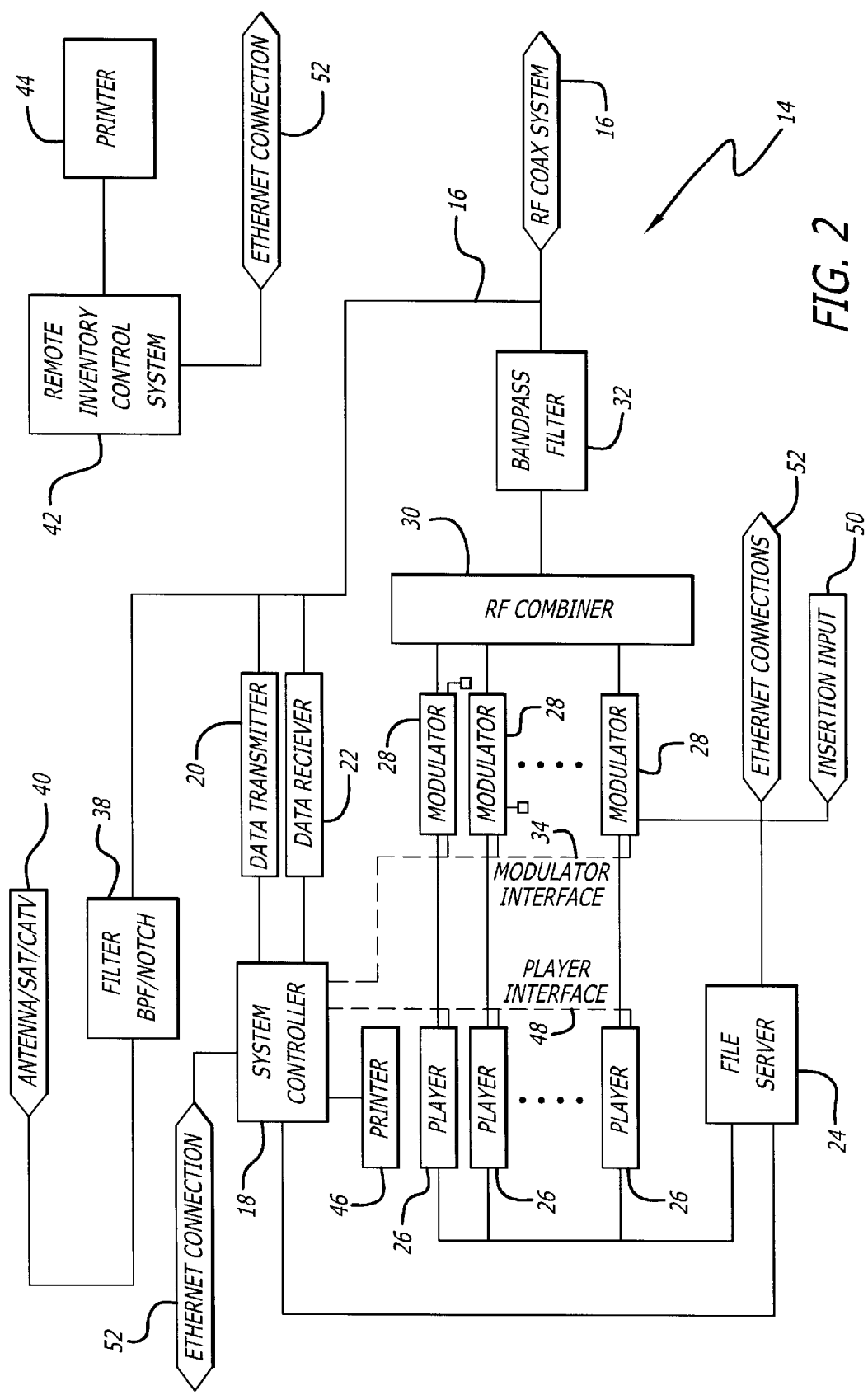
FIG. 2 is a detailed block diagram of the head-end system of FIG. 1.

As shown in FIG. 2, one embodiment of the head-end system 14 includes a system controller 18. The system controller 18 communicates with the in-room systems (not shown) through a data transmitter 20 and a date receiver 22. The transmitter 20 transmits data to the in-room systems 12, while the data receiver 22 receives data from the in-room systems. Communication between the transmitter 20 and the receiver 22 and the in-room systems 12 occurs through the RF coax system 16. The head-end system 14 also includes a file server 24, a plurality of players 26, a corresponding plurality of modulators 28, an RF combiner 30 and a bandpass filter 32.

In a preferred embodiment of the invention, the players 26 comprise individual personal computers (PC) having audio cards and/or video cards for storing media accessed from the file server 24. These players 26 may have from one to four output channels. In another embodiment, the players 26 comprise audio media players, such as CD, DAT and/or mini disc players and/or video media players such as DVD or VCR players. The head-end system 14 may include a number of players 26 that continuously play media for transmission over the RF coax system 16. These players 26 are referred to as "continuous-play" players. The head-end system 14 may also include a number of players 26 that play media only when requested to do so. These players 26 are referred to as "on-demand" players. The number of on-demand players included in the head-end system 14 does not necessarily equal the number of in-room systems 12, less may be provided depending on the demand for use placed on the system. The head-end system 14 may include both continuous-play players and on-demand players. Each player 26 has a unique frequency of transmission and thus comprises one channel of the entertainment system 10. Each player 26 is also accessible by the system controller 18 through a player interface 48.

Associated with each player 26 is a modulator 28. The modulators 18 are responsive to the signals from the players 26 and modulate these signals for transmission over the RF coax system 16 in a predetermined modulation scheme. For example, in one embodiment of the invention, the modulators 28 are FM modulators and the signals are transmitted at frequencies within the FM radio band. Any other type of modulators/modulation schemes may be used to transmit the signals at frequencies within the RF band. The transmission frequency of each modulator 28 may be fixed or may be set by the system controller 18 over the modulator interface 34. The signals from the modulators 28 are received by the RF combiner 30 and pass through the bandpass filter 32 before being transmitted over the RF coax system 16.

The head-end system 14 also includes a filter 38 for filtering the signals from the MATV system 40 to prevent interference with the access-only media signals provided by the players 26. Also included in the head-end system 14 is a remote inventory control system 42 with an attached printer 44. The system controller 18 is also provided with a printer 46. The head-end system 14 further includes an insertion input 50 which provides an access-only media feed to the modulators 28. Although the feed is only shown going to one of the modulators 28, the feed may be provided to additional modulators. The access-only media provided over the insertion input 50 may include hotel announcements and/or advertisements. At the modulators 28, the insertion media interrupts the player media and is fed over the RF coax system 16, in place of the player media, to the active in-room systems 12. The system controller 18, file server 24 and remote inventory control system 42 interface with each other through an Ethernet connection 52. The system controller 18 may route information to other computers such as the hotel property management system (HPMS) (not shown) and the system operators offices (not shown).

Figure 3:
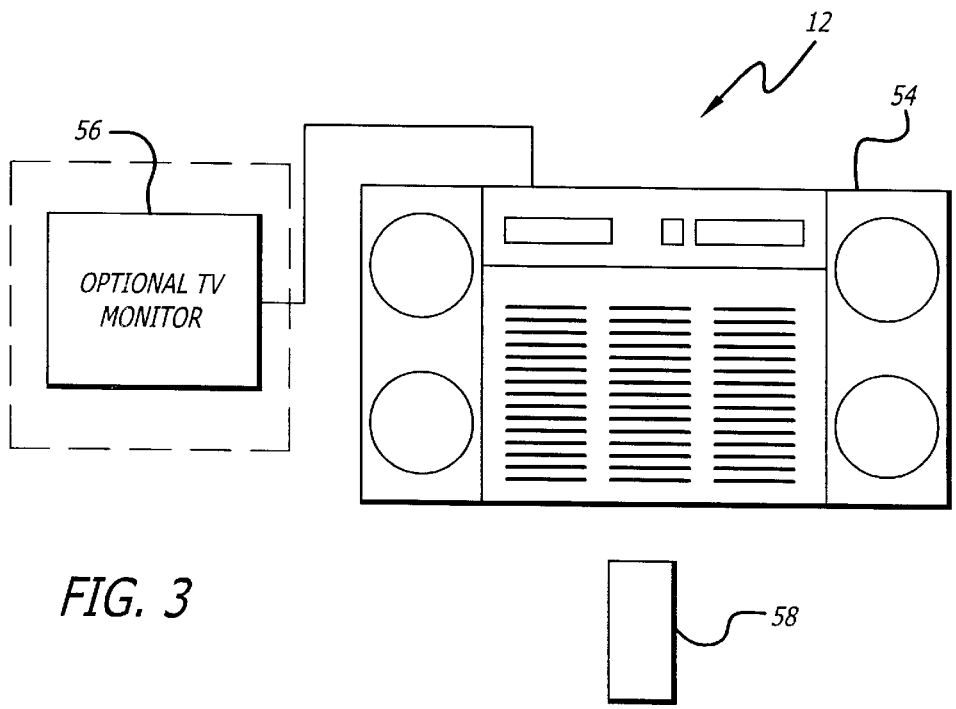
FIG. 3 depicts hardware components of the in-room system of FIG. 1 including a media player/dispenser, a video monitor and a remote control.

As shown in FIG. 3, the in-room system 12 includes a media player/dispenser 54, a video monitor 56 and remote 58. In an alternate embodiment of the invention, the in-room system 12 may provide access to audio media only, in which case, the video monitor 56 is absent from the in-room system. With reference to FIG. 4, the media/player dispenser 54, in one configuration, includes a CD player 60, a control panel 62, a display 64, right and left speakers 66 and a media dispenser 68.

The media dispenser 68 includes a front door (not shown) behind which are three parallel vertical storage cabinets 70. Each individual cabinet has a plurality of slots 72, each capable of holding a piece of acquisition media to be dispensed, such as CDs. In alternate configurations the media dispenser 68 may be in a carousel or horizontal configuration. Different types of acquisition media may be held in the various cabinet styles. The media dispenser 68 also includes sensors (not shown) that monitor the removal of the acquisition media. Other sensors monitor the open-closed state of the door and the locked-unlocked state of the media dispenser 68. A light may be includes to illuminate the acquisition media. The light may be operated by the system controller 18 (FIG. 2) or under manual control such as the open state of the door or a manual switch. The media dispenser 68 (FIG. 4) may also include a credit card swipe, which in conjunction with the RF coax system, may allow for user purchases through the system controller 18.

Figure 5:
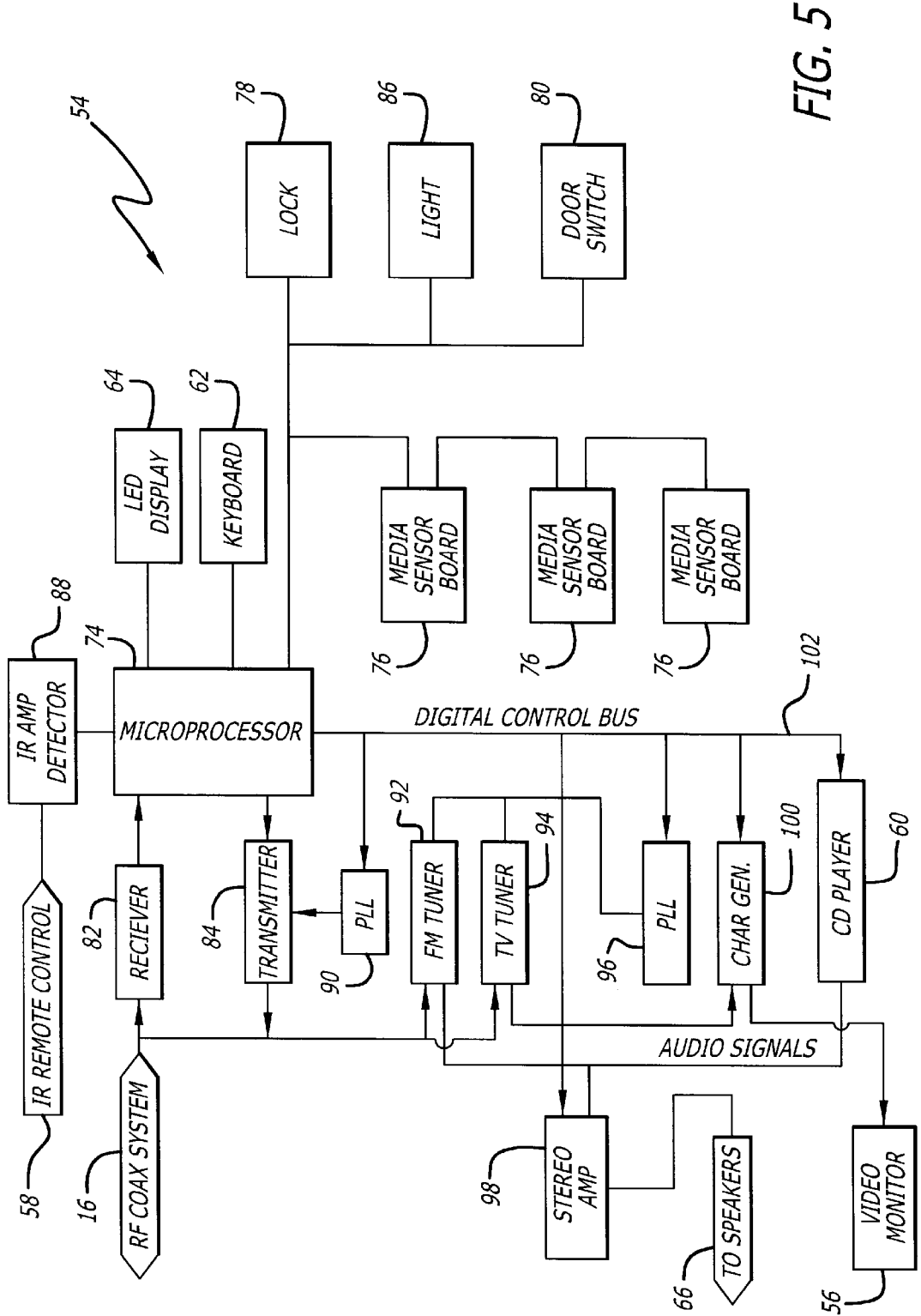
FIG. 5 is a detailed block diagram of the media player/dispenser of FIG. 3.

As shown in FIG. 5, the media player/dispenser includes a microprocessor 74 that receives signals from the media sensors 76, the lock 78 and door switch 80 for monitoring the opened-closed and locked-unlocked states of the media dispenser cabinet door and for sensing the presence or absence of the acquisition media within the cabinets 70 (FIG. 4). The microprocessor 74 (FIG. 5) also communicates with the system controller 18 through the RF coax system 16. This communication takes place through a receiver 82 and a transmitter 84. In one configuration of the media player/dispenser 54 the receiver 82 is a frequency shift keying (FSK) receiver and the transmitter 84 is a 8–13 MHz transmitter. The receiver 82 may be programmed to receive specific channels. For example, if the in-room system 12 includes a video monitor, the receiver may be programmed to receive MATV system channels as well as the entertainment system 10 channels. The transmitter 84 has an associated phase lock loop (PLL) 90 for setting the frequency of the transmitter under command from the microprocessor 74.

Figure 6:
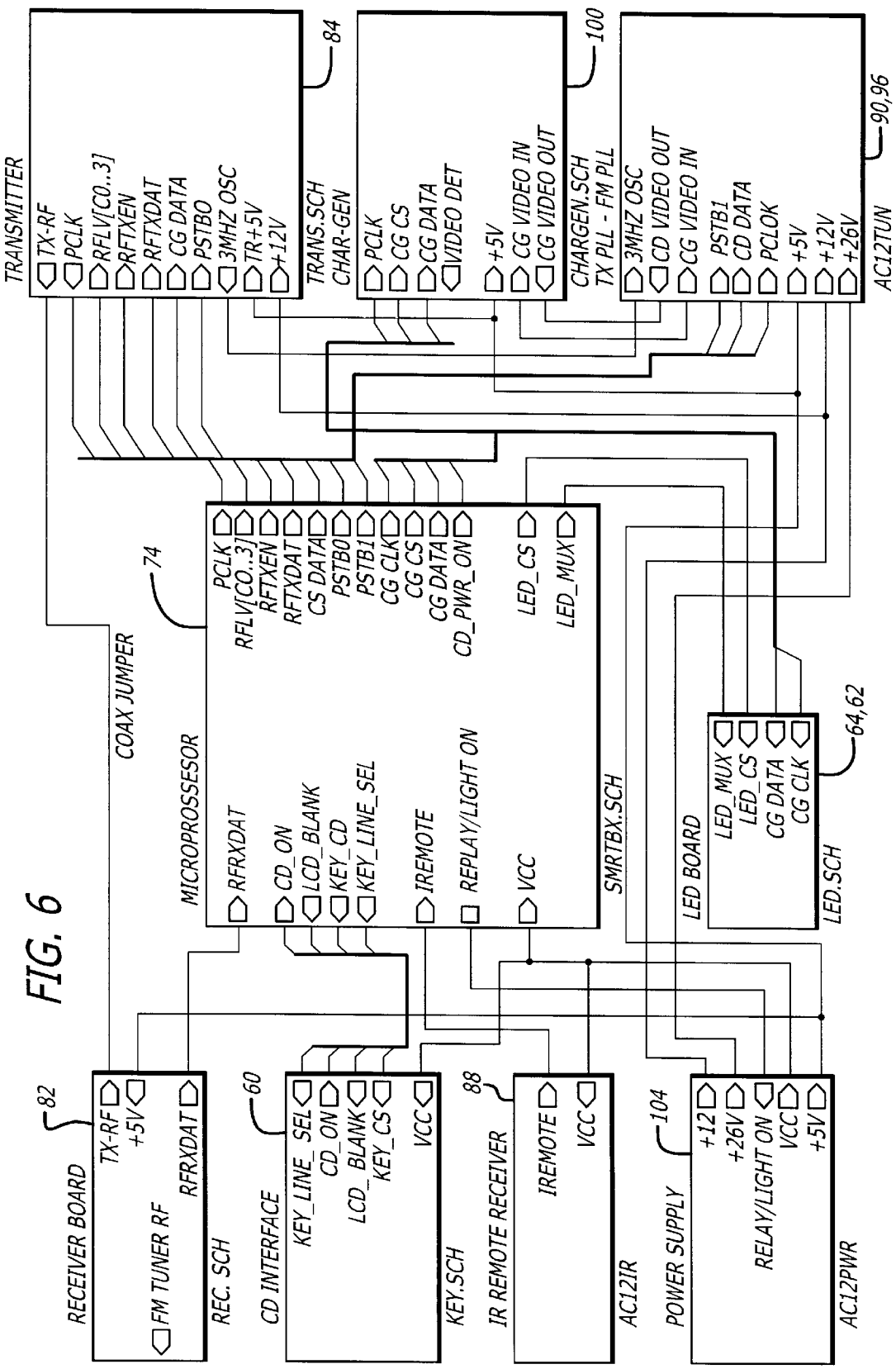
FIG. 6 is a further detailed block schematic diagram of aspects of the media player/dispenser of FIG. 5.

The media player/dispenser 54 also includes an IR amp detector 88 for receiving signals from the remote control 58. Further included are an FM tuner 92 and a TV tuner 94 with an associated PLL 96. The FM tuner 92 is tuned to receive audio data from the head-end system 14 over the RF coax system 16 while the TV tuner is tuned by the PLL to receive ANV data from the head-end system and/or the MATV system. By tuning for the MATV system channels, the entertainment system 10 may be configured to function as a pay-per-view movie system. Each tuner 92, 94 forwards audio data to the stereo amplifier 98. The TV tuner 94 also forwards video data to the character generator 100 which, in turn, forwards data to the video monitor 56. The microprocessor 74 provides control signals to the PLLs 90, 96, the character generator 100, the CD player 60 and the stereo amplifier 98 over a control bus 102. Details of the interconnection between the microprocessor 74 and other media player/dispenser 54 components are shown in FIG. 6.

As previously mentioned, access-only media is stored at a central site, i. e., the head-end system 14. The type of access-only media provided and the user cost, if any, for such media is entirely dependent on the requirements and objectives of the hotel management. Access-only media may include full-length musical recordings by a wide variety of artists. For example, in one configuration of the system, one hundred full-length recordings are available for selection by the user. Access-only media may also include compilation musical recordings that include a number of sample tracks selected from a number of different full-length recordings. These compilation recordings are usually genre specific, e. g., country, top 40, classical, easy listening, jazz/blues, family, and may include entire tracks or edited versions of selected sample tracks. The compilations may further include a narrative providing information on the sample and the artist or may include artist interviews. Access-only media may also include purely narrative media such as book readings, educational programs and adult programs. Access-only media may also include movies.

Some of the access-only media is continuously available over the system through the continuous-play players, each at a unique frequency. This access-only media is referred to as "continuous" access-only media. Thus, in essence, the system 10 provides closed-circuit radio programming that is available to all users at all times. In one configuration of the system 10 the continuous access-only media includes the genre-specific media. The remaining access-only media is available only on demand by a user. This access-only media is referred to as "on-demand" access media. Depending on the configuration of the system 10, specifically the number of on-demand players, the availability of on-demand access media may be limited. If all players are in use, the user may be instructed to try their selection at a later time.

As a means of generating additional revenue, hotel management may charge users for accessing the access-only media. Such charges may be based on duration of access, e. g 10 cents/minute, $5.00/hour, etc., or on a flat fee, regardless of the duration of access. In the case of continuous access-only media, additional revenue may be obtained through the inclusion of advertising in the programming.

With regard to acquisition media, the type of media included in the in-room systems 12 depends on the demand for the media. The acquisition media typically includes full-length musical recordings by a variety of artists from a variety of genres. The genres represented in the acquisition media may vary depending on the location of the hotel and the demographics of the hotel guests. As a means of promoting the purchase of acquisition media, some of the access-only media, specifically the genre-specific compilations, may include samples of recordings from some of the full-length acquisition media. In addition, some of the acquisition media may be available in the on-demand access media. Thus the user is afforded an opportunity to listen to a full-length recording prior to making a purchasing decision. While the foregoing discussion of access-only media and acquisition media has centered on musical and narrative recordings, entertainment systems 10 in accordance with the invention may provide other types of media such as movies and video games.

In operation, the system 10 may have two modes of operation, a normal mode and an interactive mode. In the normal mode of operation the user generally accesses continuous access-only media, while in the interactive mode the user generally accesses on-demand access media.

Upon power on of the in-room system 12, the system 10 is in the normal mode of operation. The FM tuner 92 in the media player/dispenser 54 is automatically tuned to receive audio data from one of the continuous-play players. This audio data may comprise a welcome message from the hotel. Because this audio data is stored in one of the continuous-play players, a user may not always access the data as the beginning. The data, however, is of limited duration and the user may hear the entire data by allowing the data to repeat itself from the beginning.

Figure 7:
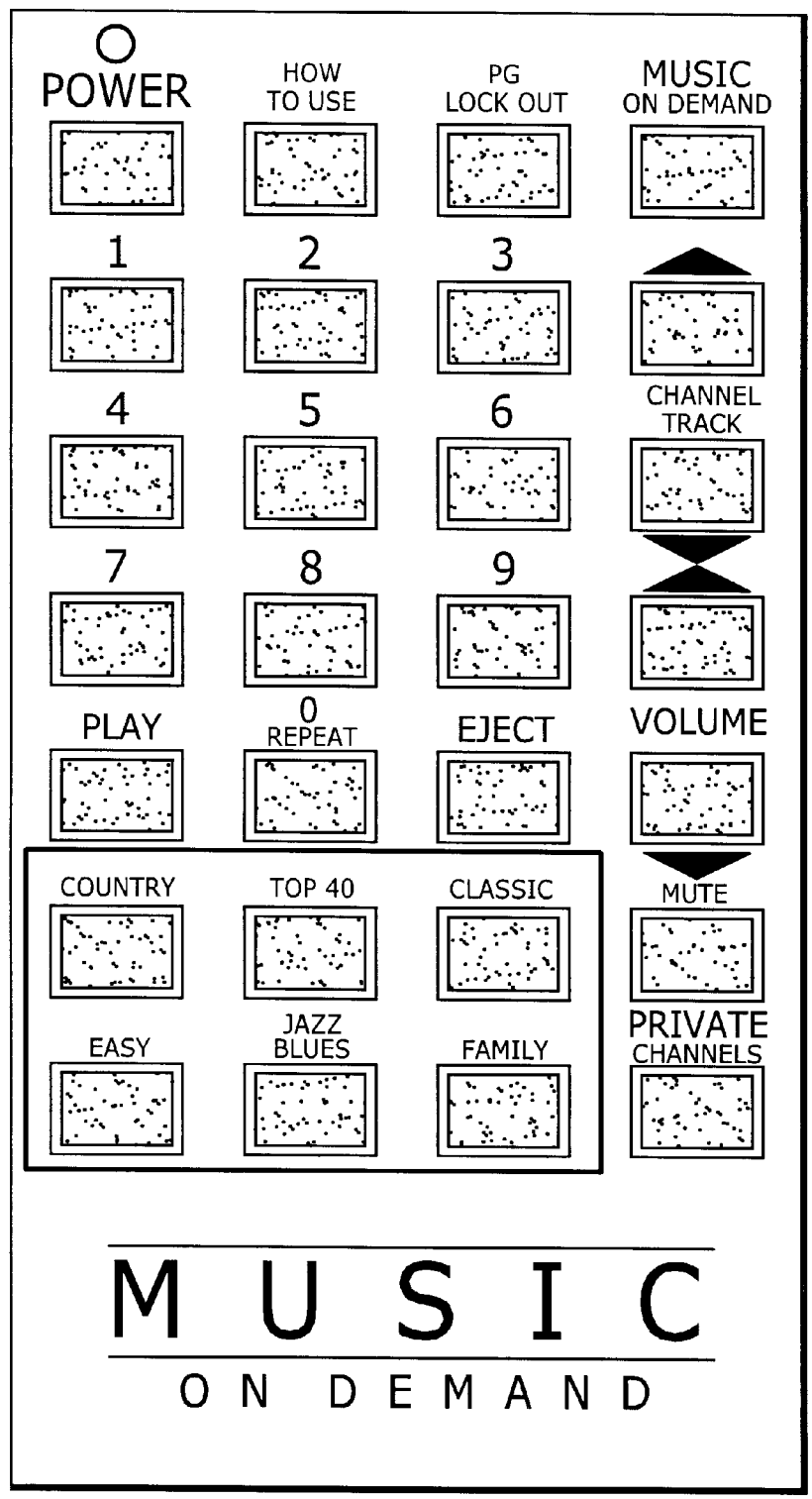
FIG. 7 is an example of one of many possible configurations of the buttons on the remote of FIG. 3.

The user may enter a selection through either the keyboard 62 on the front of the media player/dispenser 54 or through the remote control 58 such as that shown in FIG. 7. If the user presses the HOW TO USE button at anytime during operation, the FM tuner in the media player/dispenser 54 is automatically tuned to receive audio data from another one of the continuous-play players. This data may comprise instructions regarding the operation and features of the system. Again, because this audio data is stored in one of the continuous-play players, a user may not always access the data as the beginning. The user may, however, hear the entire data by allowing the data to repeat itself from the beginning.

If the user presses one of the six genre-specific music buttons, COUNTRY, TOP 40, CLASSICAL, EASY, JAZZ/BLUES or FAMILY, the FM tuner 92 in the media player/dispenser 54 is automatically tuned to receive audio data from the continuous-play player which is playing that genre-specific compilation. The microprocessor 74 generates and stores an access signal encoded with a room identifier unique for the in-room system 12 at which the user made his selection. The access signal also includes a media access identifier unique for the media accessed by the user. This access signal is subsequently transmitted to the system controller 18 in the head-end system 14. The transmission of this access signal may occur immediately after generation or it may be delayed until the system controller 18 polls each of the in-room systems 12 for access signals.

Once the signal is received by the system controller 18 it is processed to determine whether there is any charge associated with the acquisition. The system controller 18 includes a price look-up table. The media access identifier is correlated with the price look-up table to determine whether there is a charge. If there is a flat fee charge associated with the access the charge is added to the room bill, typically as a room service charge. If there is a duration charge associated with the access then the system controller 18 starts a timer for that in-room system 12 and continues running the timer until it receives a access-terminated signal from the microprocessor 74 indicating that the media is no longer being accessed. The system controller 18 then calculates the charge based on the duration and the price per unit time. This charge is added to the room bill. The microprocessor 74 may be programmed to provide a free sample period during which the user may access the media for a specified period of time before being charged by the system.

If the user presses the MUSIC ON DEMAND button or the PRIVATE CHANNELS button, the system 10 enters the interactive mode and the user is prompted to select one of the available on-demand access media for listening. Selection of the media may be accomplished by entering the number of the desired media. A list of available on-demand access media may be provided in the form of printed material placed near the in-room system 12. Alternatively, the available media may be displayed on the in-room system display 64. Upon selection of a media, the microprocessor 74 generates and stores an access signal encoded with a room identifier unique for the in-room system 12 at which the user made his selection. The access signal also includes a media access identifier unique for the media accessed by the user. This access signal is subsequently transmitted to the system controller 18 in the head-end system 14. As previously mentioned, the transmission of this access signal may occur immediately after generation or it may be delayed until the system controller 18 polls each of the in-room systems 12 for access signals.

Once the signal is received by the system controller 18 it is processed to 1) access the on-demand access media and 2) determine whether there is any charge associated with the acquisition. To access the media, the system controller 18 locates an available on-demand player 26 and forwards the media access identifier to the file server 24. The file server 24 then downloads the on-demand access-only media to the player 26. The player 26 then begins transmitting the media to the in-room system 12. With regard to pricing, the system controller 18 includes a price look-up table. The media access identifier is correlated with the price look-up table to determine whether there is a charge. If there is a flat fee charge associated with the access the charge is added to the room bill, typically as a room service charge. If there is a duration charge associated with the access then the system controller 18 starts a timer for that in-room system 12 and continues running the timer until it receives a access-terminated signal from the microprocessor 74 indicating that the media is no longer being accessed. The system controller 18 then calculates the charge based on the duration and the price per unit time. This charge is added to the room bill. The microprocessor 74 may be programmed to provide a free sample period during which the user may access the media for a specified period of time before being charged by the system.

In order to purchase acquisition media the user first gains access to the media by unlocking the front door. This may be accomplished with a push button, a remote control, or by calling the front desk. The user than selects the acquisition media he wants and removes it from the media dispenser 68. Upon removal, a sensor is activated and the microprocessor 74 records the removal/purchase. The system controller 18 periodically polls each in-room system 12 for removal/purchase records. When requested by the system controller 18, the microprocessor 74 relays the purchase record to the system controller which in turns bills the user for the purchase of the acquisition media as a room service charge. The microprocessor 74 may be programmed to provide for a free check-out period during which the user may remove a media from the media dispenser 68 and 1) either return it to the media dispenser within the check-out time to avoid a charge, or 2) keep it and thereby purchase it. Protection against unauthorized purchases may be guaranteed by requiring the user to enter an access code in order to make a purchase. An optional device may also be installed in the media dispenser 68 to prohibit the return of the media. As previously mentioned, the in-room system 12 may include a credit card swipe thus allowing for acquisition media to be purchased without it being charged to the room. In this configuration, the door is unlocked by the system controller 18 once credit card authorization is obtained.

If the user desires to prevent unauthorized access to media and/or acquisition of media he may lock the system by pressing the PG LOCK OUT button followed by a two digit locking code assigned to that in-room system 12. In the alternative, the system controller 18 may be programmed to provide for the blocking of specific pay channels or locking the door to the media dispenser 68.

The system controller 18 periodically provides access and acquisition data to the HPMS and the inventory control system 42. This allows for the tracking of the number of times each specific media is accessed or acquired. Based on this data, programming material may be created to better suit the demands of the users. In addition, an adequate inventory of acquisition media may be maintained.

With reference to FIG. 8, the access-only media available within the system 10 may be periodically updated. Each individual complex 106 or hotel in a chain is accessible by the hotel chain master server 108 through a communications line 110, such as an Ethernet line. New access-only media may be downloaded over the Ethernet line 110 to each hotel 106 in a chain. This allows for automated, periodic update of access-only media and maintains uniformity among each hotel 106 in a chain. It also allows for data, such as program access and media sales information, from each individual hotel to be monitored and tracked by the master server. Of course, each hotel may add and/or remove access-only media from their file server 24 to better serve their guests.

Figure 9:
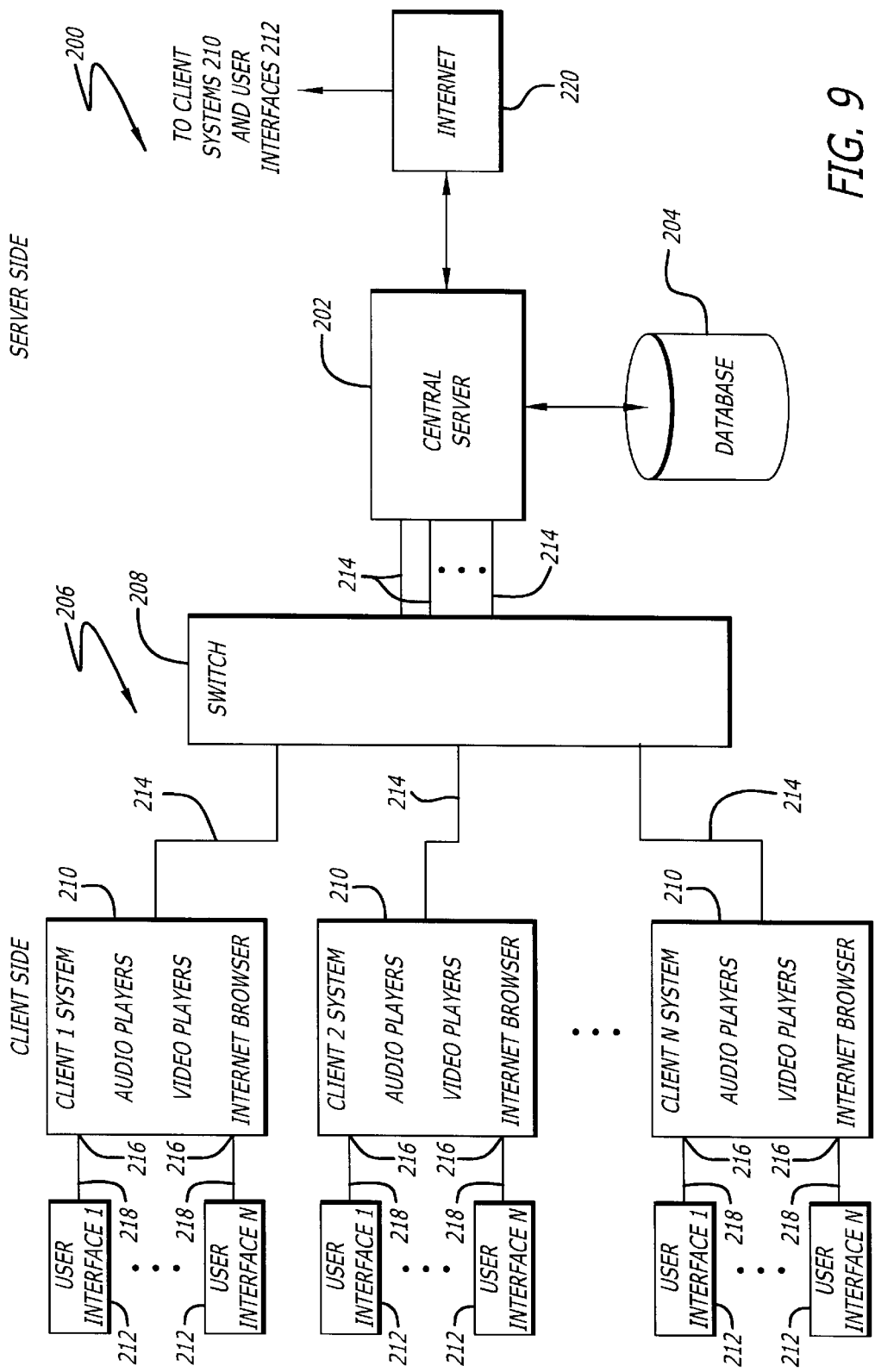
FIG. 9 is a block diagram of a multi-room entertainment system in accordance with the invention including a server side having a central server and a database and a client side having a plurality of client systems with a plurality of in-room, user interface systems.

With reference to FIG. 9 in another configuration, the system is a client/server type network system having a server side 200 and a client side 206. In this configuration, the server side 200 includes a central server 202, such as a Linux server, and a central database 204. The central database 204 stores audio and/or image, e. g, still image and video, media-data files in a standard downloadable or streaming format, such as MP3 or MPEG-2. The central server 202 interfaces with the client side 206 through a switch 208. The switch 208, in turn, interfaces with one or more client or intermediate systems 210. The interface between the central server 202, switch 208 and client severs 210 is facilitated by an Ethernet connection 214, such as a 100 BaseT connection. Each client system 210 comprises a processor capable of launching one or more audio and/or video players and one or more Internet browsers. Each client system 210 includes several audio/video outputs which interface with a plurality of in-room system user interfaces 212 through modulators (not shown) and RF communications lines 218. In a preferred configuration, the user interfaces 212 include a video monitor, remote control, speakers and an interface device.

Operation of the system is controlled by system software housed within the central server 202. The system software provides a graphical user interface (GUI) between system users and the system. The system software also controls the flow of data from the database 204 to the client systems 210 and the user interfaces 212. In response to user inputs entered at the user interface 212, the system software causes the central server 202 to send data to the client system 210 associated with the user interface. The data sent by the central server 202 may include GUI data, such as HTML interface screen data, or media data such as MP3 audio data or MPEG-2 video data. Once within the client system 210, the media data is sent to the appropriate user interface 212.

The central server 202 provides "on-demand" and "radio" modes of operation. In the on-demand mode, the server 202 provides to a user interface 212 only those media data which are selected through the user interface. In the radio mode, the central server 202 is programmed to stream media data on a continuous basis. The media data is streamed over various genre specific channels which may be accessed by the user interface 212. In one embodiment of the invention, channel programming is accomplished by monitoring the "on-demand" media selections made by users at a number of in-room systems and generating a play list based on the number of times a media is selected. Data indicative of the number of times a media data is selected is stored in the central database 204. Periodically, this data is reviewed by the system software to determine which media have a selection number that meets a specified criteria. The media-data channel play lists are then updated to include that plurality of media data having a selection number that meets the specified criteria. The specified criteria may be those media data having a selection number within a top number, e. g., ten, twenty, forty, etc., of all selection numbers.

Once the media data comprising a channel's play list is established, the central server 202 accesses the media data, in play list order, and streams the data over the channel's associated communication line 214 to each of the client systems 210. The client systems 210, in turn, streams the channel over a dedicated output (not shown) to which the in-room systems may tune to gain access.

Figure 10:
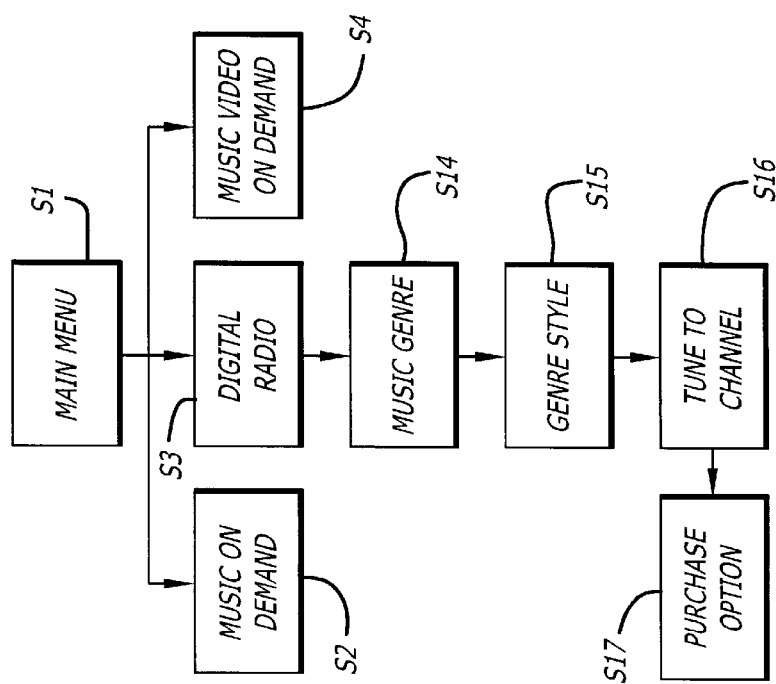
FIG. 10 is a flow chart of the various modes of operation of one configuration of the system including Music On Demand, Video On Demand and Digital Radio modes.

With reference to FIG. 10, the detailed operation of the system is as follows. At step S1, a user is presented with a main activation menu screen through which he may access the system. In one embodiment of the system, there are three aspects of the system which may be accessed by the user. These aspects include Music On Demand S2, Music Video On Demand S3 and Digital Radio S4. Other configurations of the system may comprise more or fewer aspects, for example, Internet access may be included as an additional feature of the system. Once the user accesses the system, the system software presents a series of selection menus through which the user may select one or more media data file to play.

Depending on which aspect of the system is accessed by the user, the system determines if there is a charge associated with the access. For example, in the Music On Demand and Video On Demand aspects of the system, there may be a time-allotted fee associated with use of the system. In this fee arrangement, the system senses, via user menu selection, when an in-room system 212 has accessed the On Demand feature and presents to the user interface a fee menu through which the user may purchase access to the system for a set amount of time. For example, the user may purchase system access for a twelve hour or a twenty-four hour period. Once a time-allotted selection is made, the system stores information which identifies the in-room system 212 making the selection and the particular selection made. This information is subsequently provided to the client system 210 associated with the in-room system 212 where it is stored for billing purposes. The system may further provide a free-sample period during which a user may access the On Demand system without being charged.

In another configuration of the On Demand features of the system, the system may be accessed on a per media charge. For example, media data may be provided to an in-room system 212 for one dollar per single media. Alternatively, a collection of media data, such as an entire CD, may be accessed for a flat fee. In the Digital Radio aspect of the system, access to the system is provided on a time-allotted basis similar to that previously described with respect to the On Demand features.

Figure 11:
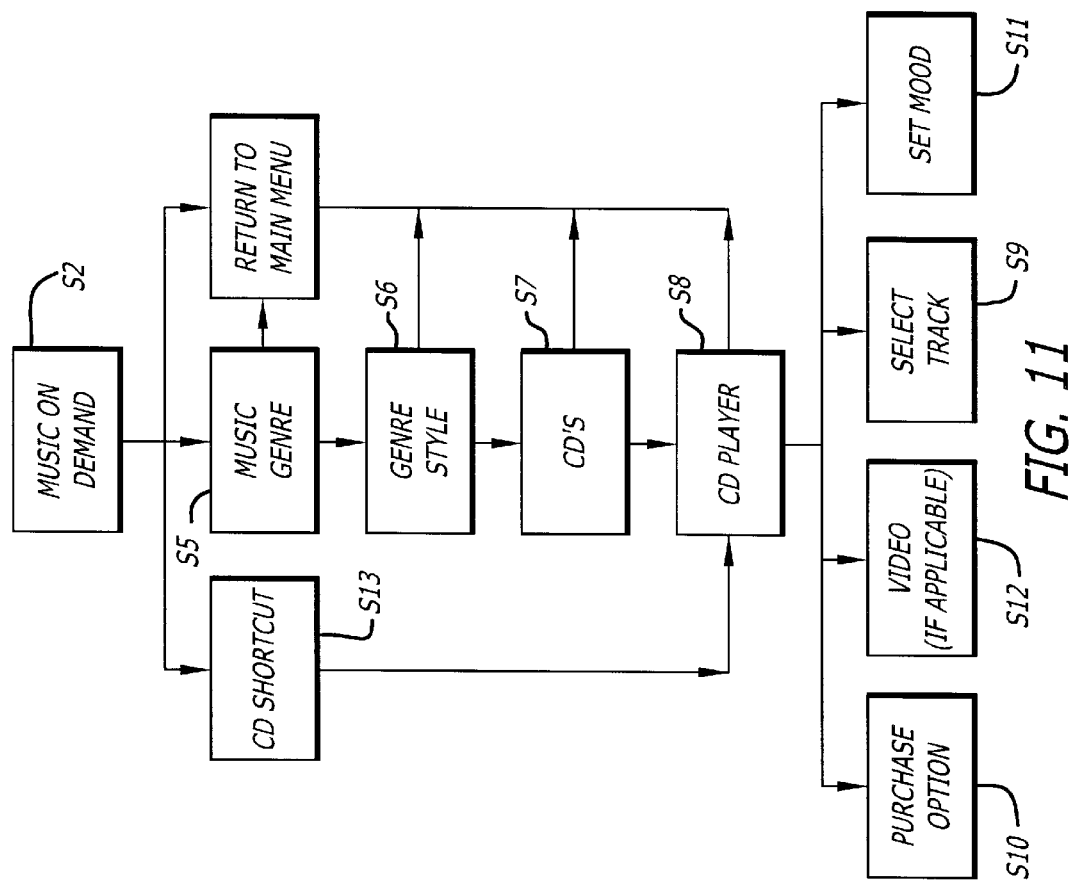
FIG. 11 is a flow chart of the Music On Demand mode of operation of FIG. 10.
Figure 12:
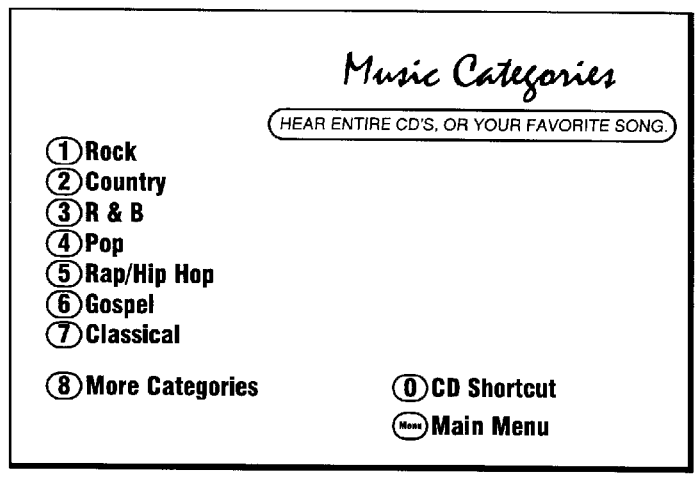
FIGS. 12–16 are exemplary screen menus presented to the user interface during system operation.
Figure 13:
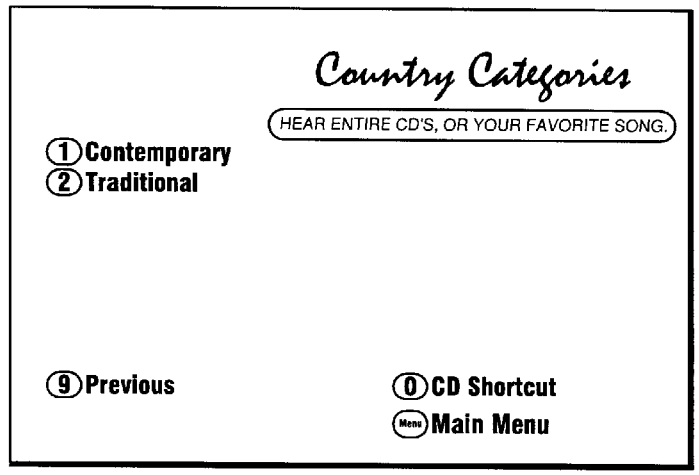
Figure 14:
Figure 15:
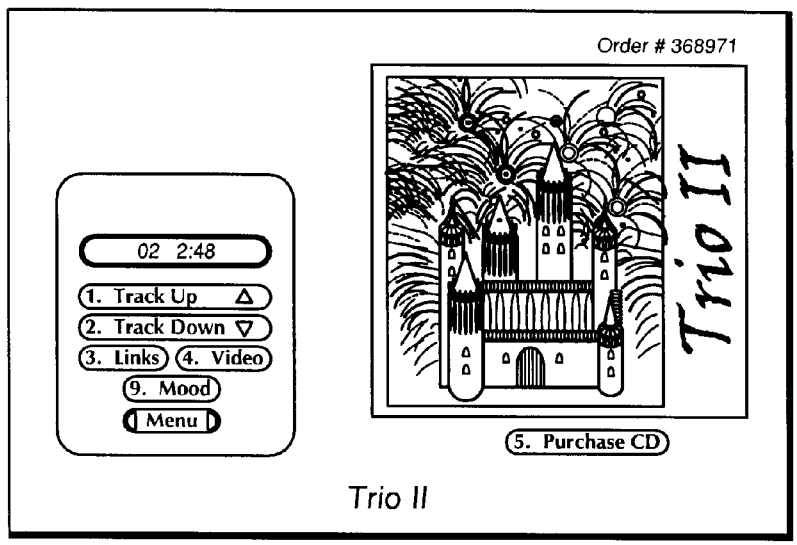

With reference to FIG. 11, if the user enters the Music On Demand system, the system software sends a genre menu screen, such as that shown in FIG. 12, to the user interface 212. At step S5 (FIG. 10), the user may select one of the genres presented. The system then sends a style menu screen, such as that shown in FIG. 13, to the user interface 212. At step S6, the user may then select a style of music. At step S7, the user is presented with a menu (FIG. 14) from which to select an audio data file collection, such as a CD. At step S8, if the user select a CD, the user is then presented with a CD player menu (FIG. 25) from which he may select a particular audio data file, i e., a track to play (S9). Once an audio data file is selected the system software causes the central server 202 to access the track from the central database 204 and to transmit the track to the user interface 212.

In one embodiment of the system, the track is transmitted by downloading a copy of the track to the associated client system 210. The client system 210 then invokes one of its audio players, such as a RealAudio player, to play the track. The client system 210 then outputs the played track to the associated user interface 212 through a communications line 218. In another embodiment of the system, the track is transmitted by streaming the track, via the client system 210, to the user interface 212.

At step S10, the system provides a purchase menu to the user interface 212. The purchase menu allows for the system user to purchase the media data which he selected for playing. The purchase of the media may comprise purchasing the entire CD, from which the track was selected or just the purchase of the track itself. A CD purchase may be completed over the telephone or, if the system configuration being used provides Internet access, through the Internet 220. A single track purchase may be completed by downloading a copy of the track through an output port of the interface device (not shown) of the user interface 212 into a memory device (not shown) attached to the output port by the user.

In one embodiment of the system, at step S11, the user is also presented with a mood menu through which the brightness level of the images displayed on the video monitor (not shown) of the in-room system 212 may be adjusted to provide a more tranquil setting. The system allows for the brightness level to be adjusted, independent of any brightness control that may be associated with the video monitor itself. In affecting the brightness of the display in this manner, the user does not have to readjust the brightness level of the video monitor once he exits the system and returns to regular television viewing.

This brightness feature may be implemented in any of several ways using either hardware or software. In one software configuration, a data file, e. g, MPEG-2 file, stored in the database 204 and defining an image to be displayed on the video monitor is received by a client system 210 through the central server 202. A software module resident in the client system 210 processes the data file by decoding the data file to obtain the image data, adjusting the image data to either increase or decrease the brightness of the image and then encoding the image data into a data file before sending it to the user interface 212. At the user interface 212, the data file is once again decoded for display on the video monitor.

In an alternate software configuration, manipulation of the brightness image data is performed by a software module resident within the user interface 212. In this case, the brightness of the image data is adjusted during the data file decoding process. In either configuration, the software module affects the brightness of the image in response to commands received through the user interface. These commands are generally received from the system user through the system remote control. In an exemplary hardware configuration, a filter increases or decreases the brightness of the image signal at a point in the image signal flow prior to the video monitor.

The mood menu may also present the user with the option of selecting a still image scene, such as a landscape scene, for display on the video monitor. The brightness of these scenes may also be adjusted, as previously described.

At step S12, if the particular audio track selected by the user has an associated music video, the user is presented with the option of accessing the music video data file in place of the audio data file. If this option is selected at the user interface 212, the central server 202 accesses the music video data file from the database 204 and transmits it to the user interface.

Figure 16:
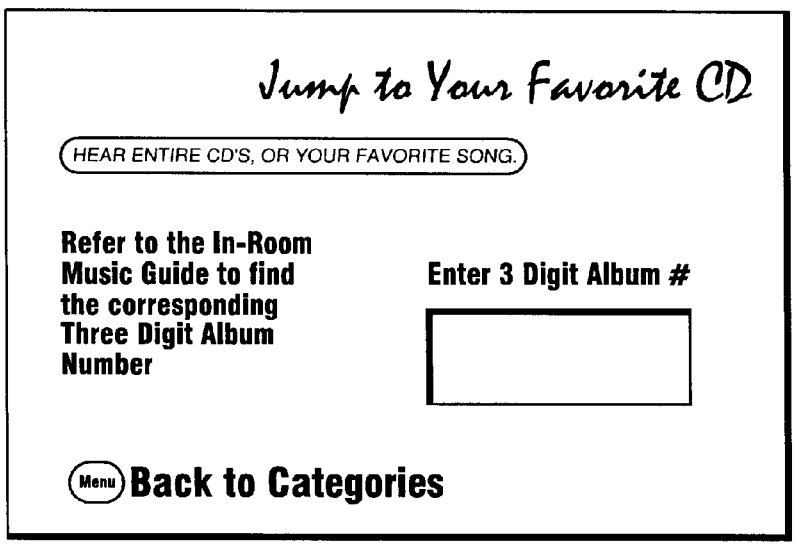

Throughout operation of the Music On Demand feature of the system, the user is provided with the option of accessing a collection of media data. For example, the user may access an entire CD of audio data files (S13). In one embodiment of the system, the user interface 212 is presented with a CD selection menu (FIG. 16) through which a CD is selected by entering a three digit CD code. The three digit codes may be listed on a print media or provided on a series of screen menus. Once the CD is selected, the central server 202 accesses the individual audio data files, in the order on the CD, and transmits the files, one-by-one, to the user interface 212.

The Video On Demand aspect of the system operates similar to the Music On Demand aspect, except that the menus presented to the user interface 212 do not necessarily include equivalent CD, CD player and CD shortcut menus.

With reference to FIG. 10, if a user enters the Digital Radio aspect of the system, the system software sends a genre menu screen, similar to that shown in FIG. 12, to the user interface 212. At step S14, the user may select one of the genres presented. At step S15, the user may then select a style of music. Once a music style is selected, the system software at S16, causes the client server 210 (FIG. 9), with which the in-room system is associated to establish communication between the in-room system and the channel which is streaming the selected music style programming.

The Digital Radio feature of the system also provides a purchase menu (S17) to the user interface. The purchase menu allows for the system user to purchase any of the media data which are included in the play list. As with the On Demand feature, the purchase of the media may comprise purchasing the entire CD, from which the track was taken, or just the purchase of the track itself.

The system software is programmed to keep track of the number of times a particular media data is accessed for play by a user interface 212. The number of times selected is tallied and stored in the central database 204. Likewise, the system keeps track of the number of times a particular media data is purchased. The information in the database is collected and may be analyzed to provide relevant market information.

It will be apparent from the foregoing that, while particular forms of the invention have been illustrated and described, various modifications can be made without departing from the spirit and scope of the invention. Therefore, it is not intended that the invention be limited, except as by the appended claims.

What is claimed is:

1. A method of providing media data to any one of a plurality of in-room systems, said method comprising:
   storing a plurality of media data in a central database;
   presenting to the in-room system a selection menu through which at least one of the media data may be selected;
   upon selection of one of the media data, accessing the selected media data from the central database and transmitting it to the in-room system; and
   presenting to the in-room system a purchase menu through which a copy of the selected media data may be purchased.

2. The method of claim 1 wherein the media data comprises audio data.

3. The method of claim 1 wherein the media data comprises audio/video data.

4. The method of claim 1 wherein the in-room system comprises a video monitor and the method further comprises:
   presenting a mood menu through which the brightness level of an image displayed on the video monitor may be selected; and
   upon the selection of a brightness level, affecting the brightness of the image independent of any brightness control inherent in the video monitor.

5. The method of claim 1 wherein transmitting the media data to the in-room system comprises:
   downloading the media data to an intermediate system;
   playing the media data at the intermediate system; and
   outputting the played media data to the in-room system through a communications line.

6. The method of claim 1 wherein transmitting the media data to the in-room system comprises streaming the media data to the in-room system through a communications line.

7. The method of claim 1 further comprising storing data in the central database indicative of the number of times a media data is selected.

8. The method of claim 1 further comprising storing data in the central database indicative of the number of times a media data is purchased.

9. The method of claim 1 further comprising delivering purchased media data to the in-room system.

10. The method of claim 9 wherein delivering the purchased media data comprises downloading a copy of the media data to the in-room system.

11. A method of providing media data to any one of a plurality of in-room systems comprising:
    storing a plurality of media data in a central database;
    presenting to the in-room system an activation menu by which communication between the central database and the in-room system is established for a fixed period of time;
    during the fixed period of time, presenting to the in-room system a selection menu through which at least one of the media data may be selected during the period of time; and
    upon selection of one of the media data, accessing the selected media data from the central database and transmitting it to the in-room system;
    wherein the in-room system comprises a video monitor and the method further comprises:
       presenting a mood menu through which the brightness level of an image displayed on the video monitor may be selected; and
       upon the selection of a brightness level, affecting the brightness of the image independent of any brightness control inherent in the video monitor.

12. The method of claim 11 wherein the media data comprises audio data.

13. The method of claim 11 wherein the media data comprises audio/video data.

14. The method of claim 11 further comprising storing data in the central database indicative of the number of times a media data is selected.

15. The method of claim 11 further comprising presenting to the in-room system a purchase menu through which the selected media data may be purchased.

16. The method of claim 15 further comprising storing data in the central database indicative of the number of times a media data is purchased.

17. A method of providing media data to one of a plurality of in-room systems comprising:
    storing a plurality of media data in a central database;
    programming a plurality of media-data channels, each of the plurality of media-data channels comprising a play list of a select plurality of the media data;
    continuously transmitting each of the media-data channels over a different communications channel;
    presenting to the in-room system a selection menu through which at least one of the media-data channels may be selected; and
    upon selection of one of the media-data channels, connecting the in-room system with the communications channel associated with the selected media-data channel;
    wherein programming the plurality of media-data channels comprises:
       presenting to a plurality of in-room systems a selection menu through which at least one of the media data may be selected for playing;
       storing data in the central database indicative of the number of times a media data is selected; and
       periodically updating each media-data channel play list to include that plurality of media data having/a selection number meeting a specified criteria.

18. The method of claim 17 wherein the specified criteria comprises a selection number within a top number of all selection numbers.

19. The method of claim 17 wherein the media data comprises at least one of audio data and audio/video data.

20. The method of claim 17 further comprising, upon selection of one of the media-data channels, calculating a charge associated with the selection.

21. The method of claim 17 further comprising presenting to the in-room system an purchase menu through which at least one of the select plurality of media data associated with the media-data channel may be purchased.

22. A method of providing media data to any one of a plurality of in-room systems having a video monitor, said method comprising:
    storing a plurality of media data in a central database,
    presenting through the video monitor a selection menu through which at least one of the media data may be selected;
    upon selection of one of the media data, accessing the selected media data from the central database and transmitting it to the in-room system;
    presenting a mood menu comprising a brightness menu through which the brightness level of an image displayed on the video monitor may be selected; and upon the selection of a brightness level, affecting the brightness of the image independent of any brightness control inherent in the video monitor.

23. The method of claim 22 wherein the mood menu further comprises a scene menu through which any one of a plurality of mood scenes may be selected and the method further comprises, upon selection of the mood scene, transmitting the mood scene to the video monitor.

* * * * *